US010957327B2

(12) United States Patent
Suzuki

(10) Patent No.: US 10,957,327 B2
(45) Date of Patent: Mar. 23, 2021

(54) SERVICE PROVIDING DEVICE AND COMPUTER-READABLE NON-TRANSITORY STORAGE MEDIUM STORING SERVICE PROVIDING PROGRAM

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/195,815

(22) Filed: Nov. 19, 2018

(65) Prior Publication Data

US 2019/0180754 A1    Jun. 13, 2019

(30) Foreign Application Priority Data

Dec. 7, 2017   (JP) .............................. JP2017-235204

(51) Int. Cl.
*G10L 15/26* (2006.01)
*G10L 15/22* (2006.01)
*G06Q 30/06* (2012.01)
*H04L 29/08* (2006.01)
*G06F 3/16* (2006.01)

(52) U.S. Cl.
CPC .............. *G10L 15/26* (2013.01); *G06F 3/167* (2013.01); *G06Q 30/0601* (2013.01); *G10L 15/22* (2013.01); *H04L 67/16* (2013.01); *G10L 2015/223* (2013.01)

(58) Field of Classification Search
CPC ............................... G10L 15/18; G10L 15/22
See application file for complete search history.

(56) References Cited

U.S. PATENT DOCUMENTS

| | | | |
|---|---|---|---|
| 9,398,143 B1 * | 7/2016 | Fullmer | H04W 12/06 |
| 2010/0153881 A1 * | 6/2010 | Dinn | G06F 3/0237 |
| | | | 715/825 |
| 2014/0032223 A1 * | 1/2014 | Powe | G06F 3/167 |
| | | | 704/275 |
| 2018/0005630 A1 * | 1/2018 | May | G06Q 20/20 |

(Continued)

FOREIGN PATENT DOCUMENTS

JP    2015-069103 A    4/2015

*Primary Examiner* — Anne L Thomas-Homescu
(74) *Attorney, Agent, or Firm* — Hunton Andrews Kurth LLP

(57) ABSTRACT

A service providing device includes a receiver configured to receive utterance content information uttered by a user; a selection unit configured to select a target content device which would accept an order from the user among a plurality of content devices that execute an order acceptance process based on the utterance content information; an inquiry execution unit configured to sequentially execute an inquiry as to whether or not the order from the user is acceptable for the other content devices, in a case where an unacceptance response is received from the target content device, based on the utterance content information uttered to the target content device which has been received together with the unacceptance response; and a switching unit configured to reset the content device that transmits an acceptance response as the target content device in a case where the acceptance response is received.

4 Claims, 3 Drawing Sheets

(56) References Cited

U.S. PATENT DOCUMENTS

| | | | |
|---|---|---|---|
| 2018/0190264 A1* | 7/2018 | Mixter | H04L 67/26 |
| 2018/0309866 A1* | 10/2018 | Devaraj | H04M 1/7255 |
| 2019/0012134 A1* | 1/2019 | Chang | G06F 3/165 |
| 2019/0058677 A1* | 2/2019 | Maekawa | H04L 51/12 |
| 2019/0080685 A1* | 3/2019 | Johnson, Jr. | G10L 15/22 |

* cited by examiner

SERVICE PROVIDING DEVICE AND COMPUTER-READABLE NON-TRANSITORY STORAGE MEDIUM STORING SERVICE PROVIDING PROGRAM

INCORPORATION BY REFERENCE

The disclosure of Japanese Patent Application No. 2017-235204 filed on Dec. 7, 2017 including the specification, drawings and abstract is incorporated herein by reference in its entirety.

BACKGROUND

1. Technical Field

The disclosure relates to a service providing device and a computer-readable non-transitory storage medium storing a service providing program.

2. Description of Related Art

Japanese Unexamined Patent Application Publication No. 2015-069103 (JP 2015-069103 A) discloses an information processing device that executes a voice search based on input voice. JP 2015-069103 A describes, in a case where information which has been input and acquired is not sufficient as search conditions when the voice search is executed and thus the voice search cannot be executed, the user is inquired so as to obtain extra information sufficient for executing the voice search and the information needed for the voice search is automatically supplemented.

SUMMARY

JP 2015-069103 A discloses that a service to be provided by an information processing device is specified for a voice search. Therefore, a user does not need to designate a type of service when using the voice search. However, in a case where there is a plurality of types of services to be provided to users, conditions needed for providing the services vary for each service; thus the user can use a service after designating the type of the service. In this case, when the user makes a wrong utterance and thus a wrong service is connected, the service that does not meet an intention of the user is provided.

The disclosure provides a service providing device capable of providing a service intended by a user and a computer-readable non-transitory storage medium storing a service providing program.

A first aspect of the disclosure relates to a service providing device including a receiver, a selection unit, an inquiry execution unit, and a switching unit. The receiver is configured to receive utterance content information uttered by a user. The selection unit is configured to select a target content device which would accept an order from the user among a plurality of content devices that execute an order acceptance process of accepting the order of a product or a service based on the utterance content information received by the receiver. The inquiry execution unit is configured to sequentially execute an inquiry as to whether or not the order from the user is acceptable for the other content devices that are different from the target content device, in a case where an unacceptance response indicating that the order from the user is unacceptable is received from the target content device, based on the utterance content information uttered to the target content device which has been received together with the unacceptance response. The switching unit is configured to reset the content device that transmits an acceptance response as the target content device in a case where the acceptance response indicating that the order from the user is acceptable is received.

In the service providing device according to the first aspect, the inquiry execution unit may be configured to execute the inquiry for the other content devices falling in the same category as the target content device.

In the service providing device according to the first aspect, the inquiry execution unit may be configured to execute the inquiry, in a case where the acceptance response is not received before a predetermined time elapses after the execution of the inquiry to the other content devices in the same category, for the other content devices falling in the analogous category as the target content device.

A second aspect of the disclosure relates to a computer-readable non-transitory storage medium storing a service providing program. The service providing program causes a computer to: receive utterance content information uttered by a user; select a target content device which would accept an order from the user among a plurality of content devices that execute an order acceptance process of accepting the order of a product or a service based on the utterance content information received by the receiver; sequentially execute an inquiry as to whether or not the order from the user is acceptable for the other content devices that are different from the target content device, in a case where an unacceptance response indicating that the order from the user is unacceptable is received from the target content device, based on the utterance content information uttered to the target content device which has been received together with the unacceptance response; and reset the content device that transmits an acceptance response as the target content device in a case where the acceptance response indicating that the order from the user is acceptable is received.

With the aspects of the disclosure, it is possible to provide a service providing device capable of providing a service intended by a user and a computer-readable non-transitory storage medium storing a service providing program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
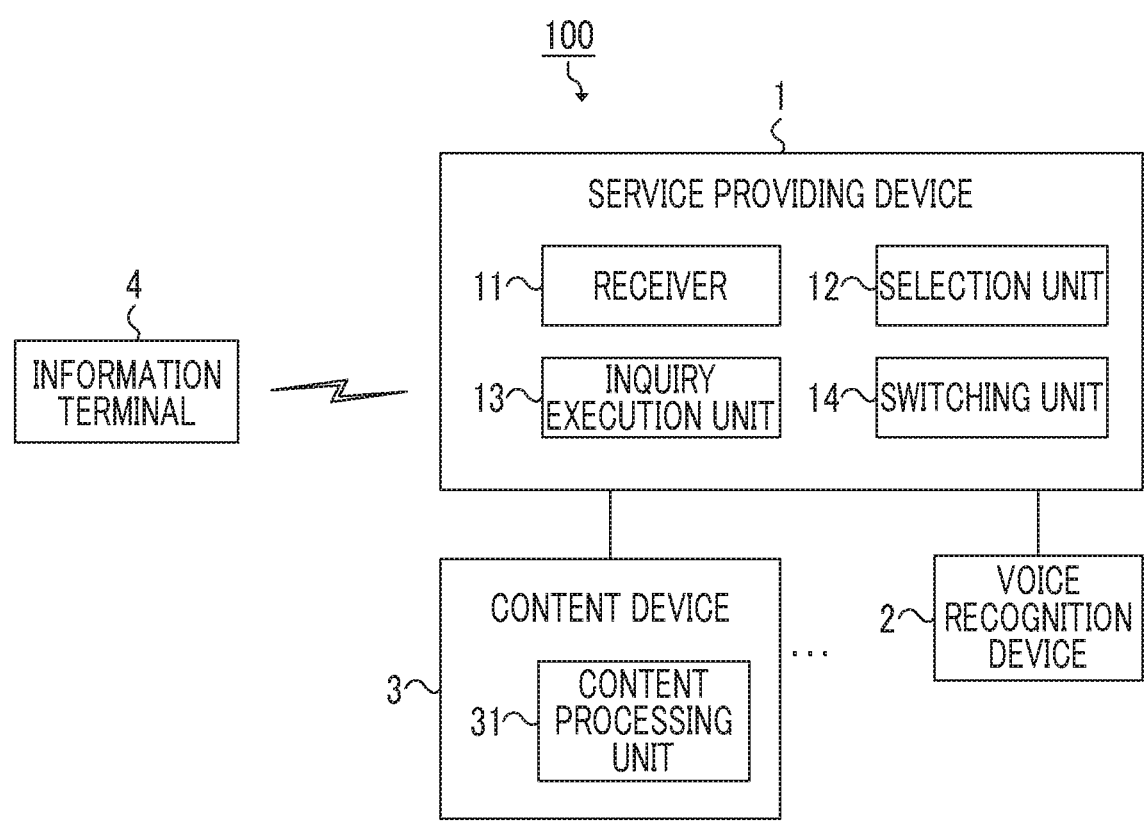
FIG. 1 is a diagram showing a configuration of a service providing system including a service providing device according to an embodiment.

Preferred embodiments of the disclosure will be described referring to the accompanying drawings. In the respective drawings, components denoted with the same reference numerals have the same or analogous configuration.

A configuration of a service providing system including a service providing device according to an embodiment will be described referring to FIG. 1. A service providing system 100 is configured to include a service providing device 1, a voice recognition device 2, and a plurality of content devices 3. An information terminal 4 is a terminal to be used by a user and is a portable terminal device including a mobile phone represented by a smartphone.

The service providing device 1 provides a service based on a voice recognition to the user operating the information terminal 4 (hereinafter referred to as "voice recognition service"). The voice recognition service of the embodiment is directed to an order acceptance service accepting an order of a product or a service by voice. In the present embodiment, an exemplified case where the voice recognition service is the order acceptance service of fast food will be described.

The communication over a network is established between the service providing device 1, the voice recognition device 2 and the content device 3, and additionally, between the service providing device 1, the content device 3 and the information terminal 4. The network may be a wired network, a wireless network, or a combination of the wired network and the wireless network.

The service providing device 1 includes, for example, a receiver 11, a selection unit 12, an inquiry execution unit 13, and a switching unit 14, as a functional configuration. The service providing device 1 includes, for example, a control unit including a central processing unit (CPU) and a memory, a storage device, and a communication device as a physical configuration. Respective functions of the receiver 11, the selection unit 12, the inquiry execution unit 13, and the switching unit 14 are implemented by the CPU executing a predetermined program stored in the memory. Details of the respective functions will be described below.

The content device 3 has, for example, a content processing unit 31 as a functional configuration. The content device 3 has, for example, a control unit including a CPU and a memory, a storage device, and a communication device as a physical configuration. The functions of the content processing unit 31 are implemented by the CPU executing the predetermined program stored in the memory. Details of the functions will be described below.

The functions of the service providing device 1 are not limited to the receiver 11, the selection unit 12, the inquiry execution unit 13, and the switching unit 14, and any function can be deleted or added as needed. For example, the voice recognition function of the voice recognition device 2 may be incorporated in the service providing device 1. The content processing unit 31 of the content device 3 may be incorporated in the service providing device 1.

The functions of the receiver 11, the selection unit 12, the inquiry execution unit 13, and the switching unit 14 included in the service providing device 1 will be sequentially described below.

The receiver 11 controls a communication exchanged with other devices and terminals. For example, the receiver 11 receives utterance content information uttered by the user from the information terminal 4. The receiver 11 transmits various notifications to the content device 3 and receives various responses from the content device 3.

The selection unit 12 selects a target content device as a content device which would accept an order from the user out of the content devices 3 based on the received the utterance content information. The content device 3 executes an order acceptance process of accepting the order of a product or a service by voice. An exemplified procedure of selecting the target content device will be described below.

First, the selection unit 12 transmits the voice received from the information terminal 4 to the voice recognition device 2. The voice recognition device 2 analyzes the received voice, converts the voice into text, and transmits the text to the service providing device 1. The voice analysis can be performed using a known voice analysis scheme.

Subsequently, the selection unit 12 selects the target content device based on the utterance content information of the text received from the voice recognition device 2.

In a case where a response received from the target content device is an unacceptance response indicating that the order from the user is unacceptable, the inquiry execution unit 13 and the switching unit 14 execute a switching process of switching the target content device. An example of the switching process will be described below.

First, the inquiry execution unit 13 sequentially executes an inquiry as to whether or not the order corresponding to the utterance content information uttered by the user to the target content device is acceptable for the other content devices falling in the same category as the target content device.

Subsequently, in a case where the inquiry execution unit 13 receives an acceptance response indicating that the order from the user is acceptable from any one of the content devices, the switching unit 14 switches the target content device to the content device that transmits the acceptance response.

On the other hand, in a case where it is not possible to receive the acceptance response before a predetermined time elapses after the execution of the inquiry, the inquiry execution unit 13 sequentially executes the inquiry for the other content devices falling in the analogous category as the target content device. A range of definition of analogue is possible to be set properly in accordance with a situation of a provided service.

Subsequently, in a case where the inquiry execution unit 13 receives the acceptance response from any one of the content devices, the switching unit 14 switches the target content device to the content device that transmits the acceptance response.

The functions of the content processing unit 31 of the content device 3 will be described below.

The content processing unit 31 determines whether or not the order from the user is acceptable based on the utterance content information received from the service providing device 1. In a case where the order is unacceptable, the content processing unit 31 transmits a voice message that the order is unacceptable to the information terminal 4 and transmits the aforementioned unacceptance response to the service providing device 1.

On the other hand, in a case where the order is the acceptable, the content processing unit 31 transmits a voice message that the order received from the user has been accepted or a voice message requesting additional utterance to the user to the information terminal 4.

Figure 2:
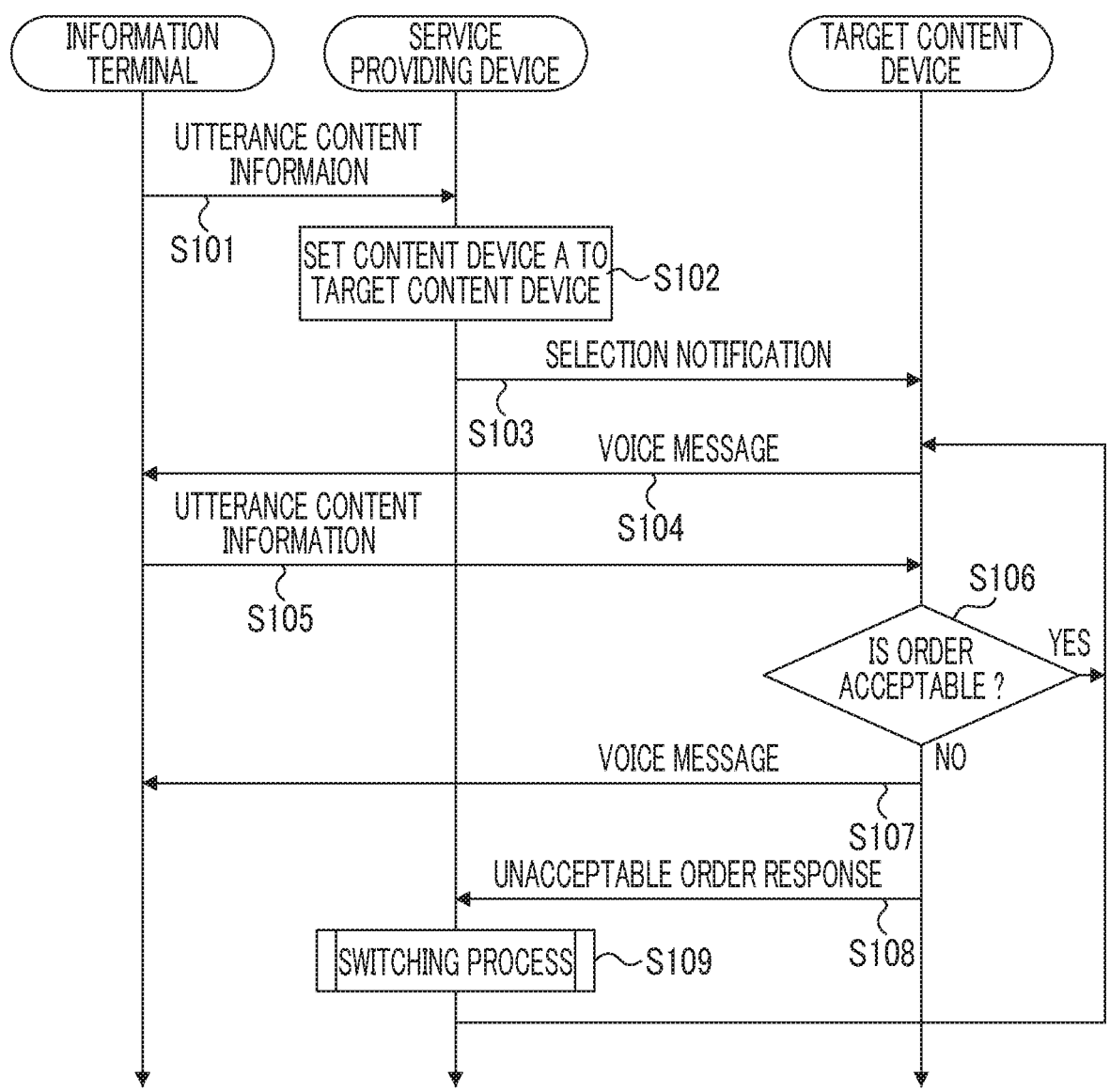
FIG. 2 is a sequence chart illustrating an example of the operation of the service providing system.
Figure 3:
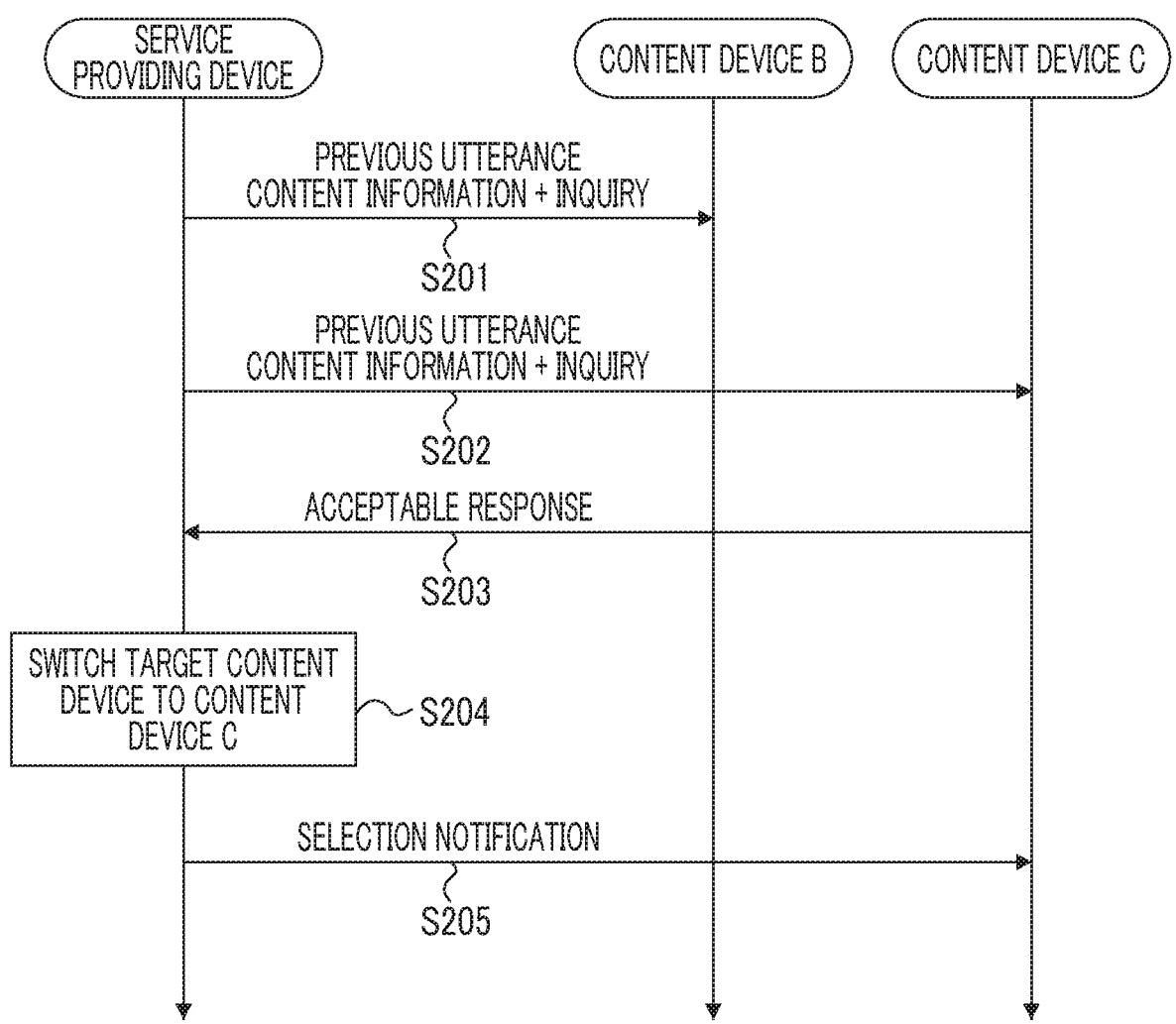
FIG. 3 is a sequence chart illustrating an operation example of the service providing system in the switching process of FIG. 2.

Next, referring to FIGS. 2 and 3, the procedure from the start of the utterance by the user to the acceptance of the order in the service providing system 100 will be described accompanying a specific example. In the specific example, in a case where the user orders a shrimp gratin pie sold by a donut shop M of a donut chain store by erroneously designating a fried chicken shop K of a fried chicken chain store will be described.

First, when the user utters "Fried chicken K", the utterance content information corresponding to the utterance is transmitted from the information terminal 4 to the service providing device 1 (step S101).

Subsequently, the selection unit 12 of the service providing device 1 selects a content device A executing the order acceptance process of the Fried chicken K out of the content devices 3 and sets the content device A as the target content device based on the received utterance content information (step S102). The selection unit 12 of the service providing device 1 transmits a selection notification indicating that the content device A has been selected as the target content device to the content device A (step S103).

Subsequently, the content processing unit 31 of the content device A transmits a voice message of "Please tell what items you want to buy" to the information terminal 4 (step S104).

Subsequently, when the user utters "Shrimp gratin pie," the utterance content information corresponding to the utterance is transmitted from the information terminal 4 to the content device A (step S105).

Subsequently, the content processing unit 31 of the content device A determines that the 'shrimp gratin pie' is unacceptable (step S106; NO), transmits a voice message of "Sorry, we don't have a shrimp gratin pie on our menu" to the information terminal 4 (step S107), and transmits the unacceptance response to the service providing device 1 (step S108).

Subsequently, the service providing device 1 executes the switching process of the target content device (step S109). In particular, the inquiry execution unit 13 of the service providing device 1 sequentially executes inquiry as to whether or not the order of the 'shrimp gratin pie' uttered by the user to the content device A is acceptable for the other content devices B and C in the same fast food category as the content device A (step S201 and step S202).

Subsequently, the inquiry execution unit 13 of the service providing device 1 receives the acceptance response indicating that the order of the 'shrimp gratin pie' is acceptable from the content device C executing the order acceptance process of the donut shop M (step S203).

Subsequently, the switching unit 14 of the service providing device 1 switches the target content device to the content device C (step S204).

Subsequently, the switching unit 14 of the service providing device 1 transmits the aforementioned selection notification to the content device C (step S205). Therefore, the switching process (step S109) ends and the process proceeds to step S104 stated above.

In this case, when the content processing unit 31 of the content device C transmits a voice message of "Shrimp gratin pie. Your order is confirmed. Do you need anything else?" to the information terminal 4 (step S104) and the user utters "Nothing for now," the utterance content information corresponding to the utterance is transmitted from the information terminal 4 to the service providing device 1 (step S105) and the order acceptance process ends.

As described above, the service providing system 100 of the embodiment enables, in a case where the target content device that would accept the order from the user is selected out of the content devices 3 based on the utterance content information uttered by the user but the unacceptance response is received from the target content device, to sequentially execute the inquiry as to whether or not the order from the user is acceptable for the other associated content devices, based on the utterance content information uttered to the target content device which has been received together with the unacceptance response, and to reset the content device which has transmitted the acceptance response as the target content device.

Accordingly, even in a case where the user made a wrong utterance, the content device 3 that does not satisfy the intention of the user is selected and thus the order is unacceptable, it is possible to sequentially execute the inquiry for other associated content devices as to whether or not they can deal with the user's utterance. When the available content device 3 is founded, the order acceptance process can be executed by switching to such available content device 3.

Therefore, the service providing system 100 of the embodiment enables to provide the service intended by the user.

Since the utterance content information uttered by the user to the target content device can be transmitted to the other content devices when the inquiry is executed on the other content devices, the user's utterance content information can be inherited to the other content devices and thus the order acceptance process can be continuously executed even when the target content device is switched.

The disclosure is not limited to the embodiments described above, and can be implemented in various other forms without departing from the gist of the present disclosure. The embodiment described above is merely illustrative, and is not to be construed as restrictive. For example, the respective processing procedures described above can be optionally changed in an order or executed in parallel unless the processes are conflicted.

What is claimed is:

1. A service providing device comprising a processor configured to:
   receive utterance content information uttered by a user; the utterance content information including information on a content and an order to the content;
   select, based on the information on the content, a target content device which would accept the order from the user among a plurality of content devices that execute an order acceptance process of accepting the order of a product or a service;
   sequentially execute an inquiry as to whether or not the order from the user is acceptable for the other content devices that are different from the target content device, in a case where an unacceptance response indicating that the order from the user is unacceptable is received from the target content device, based on the order, the unacceptance response being received when the order does not correspond to the content; and
   reset the content device that transmits an acceptance response as the target content device in a case where the acceptance response indicating that the order from the user is acceptable is received.

2. The service providing device according to claim 1, wherein the inquiry execution unit is configured to execute the inquiry for the other content devices falling in the same category as the target content device.

3. The service providing device according to claim 2, wherein the inquiry execution unit is configured to execute the inquiry, in a case where the acceptance response is not received before a predetermined time elapses after the execution of the inquiry to the other content devices in the same category, for the other content devices falling in an analogous category as the target content device.

4. A computer-readable non-transitory storage medium storing a service providing program causing a computer to
   receive utterance content information uttered by a user, the utterance content information including information on a content and an order to the content,
   select based on the information on the content a target content device which would accept the order from the user among a plurality of content devices that execute an order acceptance process of accepting the order of a product or a service sequentially execute an inquiry as to whether or not the order from the user is acceptable for the other content devices that are different from the target content device, in a case where an unacceptance response indicating that the order from the user is unacceptable is received from the target content device, based on the order, the unacceptance response being received when the order does not correspond to the content, and reset the content device that transmits an acceptance response as the target content device in a case where the acceptance response indicating that the order from the user is acceptable is received.

* * * * *